United States Patent [19]

Perego

[11] Patent Number: 5,483,877
[45] Date of Patent: Jan. 16, 1996

[54] CASSETTE STACKER/STAMPER

[75] Inventor: Luciano Perego, Milan, Italy

[73] Assignee: Tapematic U.S.A., Inc., Orlando, Fla.

[21] Appl. No.: 956,654

[22] Filed: Oct. 2, 1992

[51] Int. Cl.⁶ .................................................. B41F 17/00
[52] U.S. Cl. .......................... 101/44; 198/418; 198/397; 346/77 E
[58] Field of Search ............................. 101/44, 11, 53, 101/35, 37, 3.1, 4; 198/597, 418; 235/475, 476, 477, 486; 346/77 R, 77 E, 79, 95; 29/DIG. 37; 206/387; 242/197; 156/387, 384

[56] References Cited

U.S. PATENT DOCUMENTS

| | | | |
|---|---|---|---|
| 2,665,633 | 1/1954 | Schubert | 101/11 |
| 2,834,284 | 5/1958 | Van Buskiru | 101/35 |
| 3,702,000 | 10/1972 | Delligatti | 101/35 |
| 3,820,455 | 6/1974 | Hencley et al. | 101/3.1 |
| 3,898,926 | 8/1975 | Peres | 101/37 |
| 4,109,572 | 8/1978 | Roulleau | 101/37 |
| 4,377,111 | 3/1983 | Kincheloe et al. | 101/44 |
| 4,406,426 | 9/1983 | Crandall | 242/197 |
| 4,810,867 | 3/1989 | Speicher | 235/494 |
| 5,118,045 | 6/1992 | Perego | 242/56 R |
| 5,121,886 | 6/1992 | Perego | 242/57 |
| 5,125,587 | 6/1992 | Perego | 242/56 R |
| 5,125,588 | 6/1992 | Perego | 242/56 R |

FOREIGN PATENT DOCUMENTS

| | | | |
|---|---|---|---|
| 0130359 | 10/1981 | Japan | 101/44 |
| 0859200 | 8/1981 | U.S.S.R. | 101/35 |
| 997891 | 7/1965 | United Kingdom | 101/44 |

OTHER PUBLICATIONS

"Diskette Label Printer" IBM Technical Disclosure Bulletin, vol. 28, No. 9, Feb. 1986, pp. 4146–4148.

*Primary Examiner*—Eugene H. Eickholt
*Attorney, Agent, or Firm*—Edgar H. Haug; Adam L. Brookman; Curtis, Morris & Safford

[57] ABSTRACT

The described machine comprises a cassette infeed conveyor; stamper means for stamping incoming cassettes with an identifying code; first collection means for receiving cassettes as they are removed from the infeed conveyor; and transfer means for transferring cassettes from the first collection means to a second transfer means for accumulating a plurality of rows of loaded cassettes.

11 Claims, 3 Drawing Sheets

5,483,877

CASSETTE STACKER/STAMPER

FIELD OF THE INVENTION

The present invention relates generally to automatic cassette loading machines and more particularly to auxiliary devices for such machines which are capable of stacking loaded cassettes and of stamping loaded-cassettes with an identifying code.

Automatic loading machines of the type with which the present invention can be used are the object of other United States patents and applications in the name of the same Applicant and include U.S. application Ser. No. 07/801,261 and U.S. Pat. Nos. 5,118,045, 5,121,886, 5,125,587, and 5,125,588 which are respectively entitled Tape Loading Center, Continuous Feed and Discharge Flow Through Cassette Loading Apparatus and System, Continuous Feed and Discharge Flow Through Cassette Loading Apparatus and System, Process and Apparatus for Finding One End of Tape Wound Onto a Reel, Tape Loading Center and method and Apparatus for Locating a Predetermined Point on a Cassette-Tape, which are incorporated herein by reference.

BACKGROUND OF THE INVENTION

It is known that the loading of tape cassettes, such as audio and/or video cassettes, is carried out by automatic machines which have a loading station at which the individual cassettes are automatically taken from a supply magazine or conveyor and are filled with a predetermined amount of use tape, coming from a pancake detachable mounted on a support hub. The loaded cassettes are then sent to a reception point located at position spaced from the loading station.

Various methods and apparatus have been employed to collect the loaded cassettes which are released from the loading station. Applicant, in prior stand-alone tape loading machines, collected the loaded cassettes at a reception station directly below the loading station. A pair of opposed rows of bristles kept the received cassettes in an upright position after they had been pushed forward by pusher mechanism. When no more cassettes could be accommodated at the reception station the machine would sense this condition and would shut itself down. Thus, constant operator attention was required to keep the reception station sufficiently free to eliminate machine downtime.

A similar, but more complicated approach is set forth in U.S. Pat. No. 4,377,111 to Kincheloe et al. A separate stacker/stamper device was attached to an ordinary tape loading machine which slid received cassettes to a first position in which a stamping device (similar to a "Bates" stamper used in law offices to uniquely identify produced documents) stamped the top of the cassette with a printed code. After stamping, the cassette was transferred to a collection device which oriented the cassettes in alternating directions in a substantially vertical stack. This device, like applicant's previous device, could cause the machine to shut down when full and thus required frequent operator attention. Still further, in many instances there is a preference for the orientation of cassettes in a single direction in which the stamped code can be readily seen.

With the development of tape loading machines which can transport loaded cassettes away from the tape loading machine by conveyor, has come a need for a device which can stack and stamp large volumes of cassettes in a quick and efficient manner without significant operator intervention.

SUMMARY OF THE INVENTION

Thus, an object of the present invention is to address the above problems by providing an automatic stacker/stamper device which can quickly and efficiently stack and stamp a large volume of cassettes without requiring significant operator attention.

The foregoing and further objects that will become more apparent in the course of the present description are substantially attained by an automatic cassette stacker/stamper device comprising: a cassette infeed conveyor; stamper means for stamping incoming cassettes with an identifying code; first collection means for receiving cassettes as they are removed from the infeed conveyor; and transfer means for transferring cassettes from the first collection means to a second transfer means for accumulating a plurality of rows of loaded cassettes.

DETAILED DESCRIPTION

Figure 1:
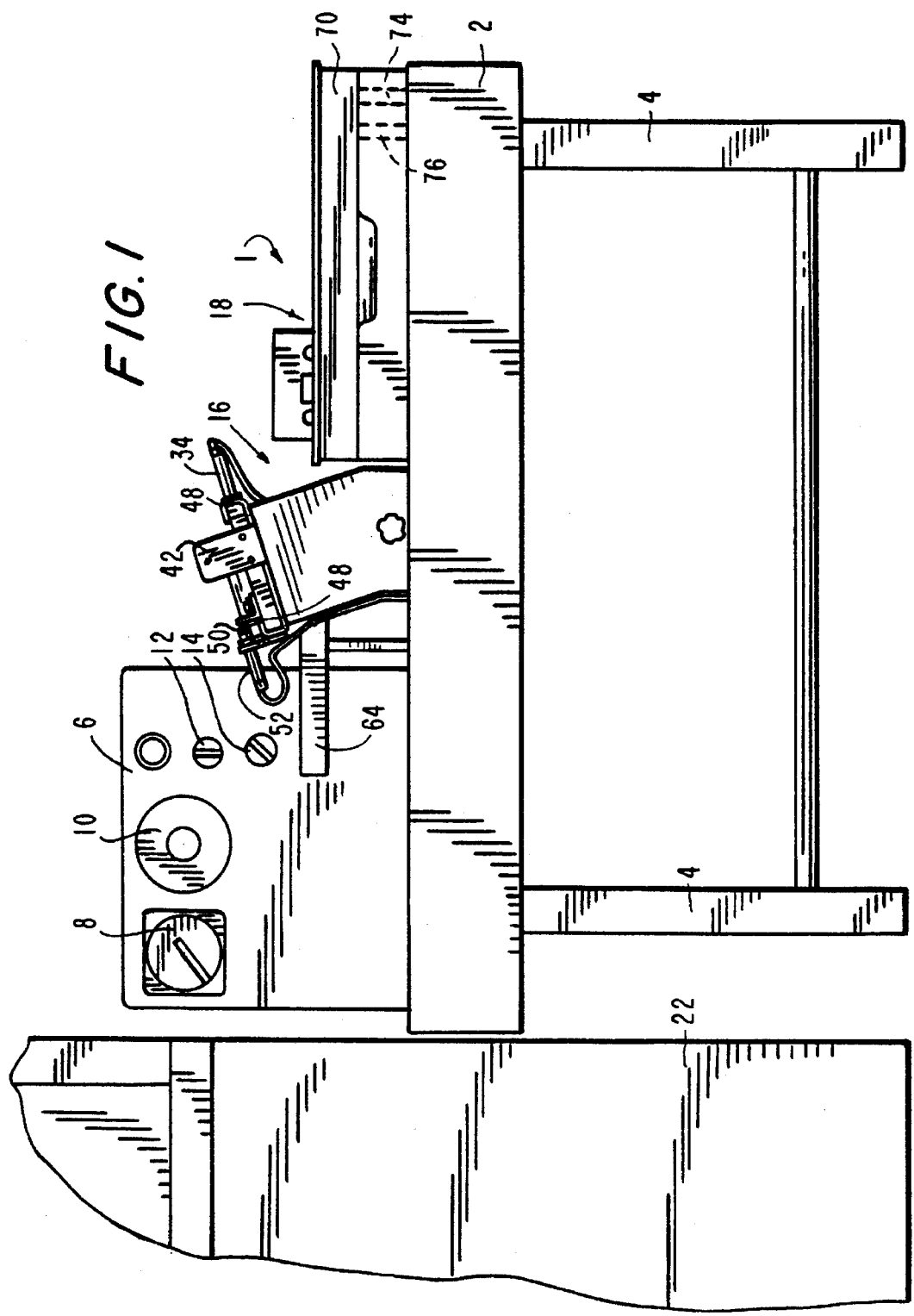
FIG. 1 is a front view of the apparatus of the present invention.
Figure 2:
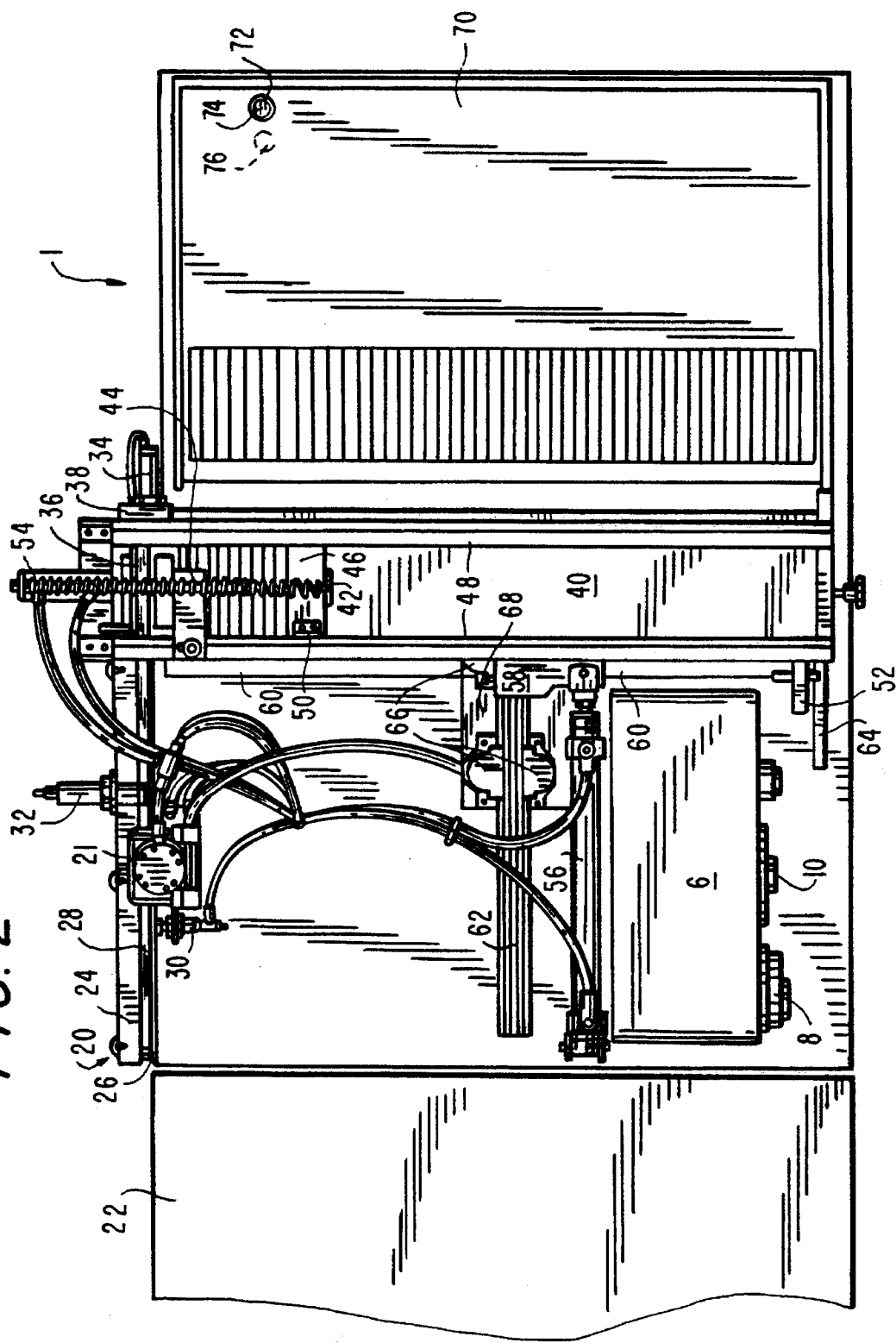
FIG. 2 is a top plan view of the apparatus of the present invention.

Referring to FIGS. 1 and 2 the stacker/stamper apparatus of the present invention is generally designated by the number 1.

The working components of the stacker/stamper 1 are mounted on a table 2 supported by legs 4. A control box 6 having: means for turning the entire device on and off 8; emergency stop means 10; infeed conveyor speed control 12; and stamper control means 14 is mounted on one side of the table 2. A first collection means 16 for receiving loaded cassettes is mounted next the control box 6. A second collection means 18 for amassing a plurality of rows of loaded cassettes is mounted next to the first collection means 16.

As shown in FIG. 2, an infeed conveyor 20, is attached to the back of the table 2 to bring cassettes from the outfeed or discharge conveyor (not shown) of a tape loading machine 22 to the vicinity of the first collection means 16. A transfer mechanism 24 is located between the control box and the infeed conveyor 20, adjacent to the first collection means 16. Finally, a "hot" stamper 21 is preferably mounted along the infeed conveyor 20 approximately midway between the start of the conveyor 20 and the first collection means 16.

In one embodiment of the present invention the conveyor 20 is upwardly inclined from a low point at which cassettes are received from a loading machine 22, to a high point adjacent to the first collection means 16. The cassettes are preferably received onto the infeed conveyor 20 in a vertical orientation and are maintained in that position by a rear guide bar 24 and a front guide wall 26 between which they are carried. A single, endless loop belt 28 is preferably used as the actual transport means of the conveyor 20.

The stamping mechanism 21 is preferably a "hot" stamper which can imprint a code, one word or several words on the top surface of the cassettes, without ink. It works by heating the stamping elements such that they can slightly melt the cassettes' plastic shell at their point of contact with the shell.

A pneumatic stopper 30 is located on the downstream side of the hot stamper 21 to prevent the succeeding cassette from impacting the cassette being imprinted by the hot stamper and to maintain appropriate spacing between the cassettes. The stopper 30 works in conjunction with a sensor 32, which is located on the upstream side of the hot stamper 21. When the leading edge of a cassette reaches a position such that the sensor 32 is blocked, the conveyor is stopped, the stopper 30 is extended and the hot stamper 21 is activated. When the cassette completes its travel past the sensor 32, the stopper 30 is retracted.

When the conveyor 20 brings the cassette to a position in line with the first collection means 16, a second sensor 34 detects the cassette's presence and sends a signal to a pneumatically controlled pusher mechanism 36. The cassette, which is stopped in front of the pusher mechanism by a wall 38, is pushed directly forward into the first collection means 16.

The first collection means 16 includes a bottom tray 40, which supports the cassettes from the bottom. A spring biased retaining member 42 applies a rearwardly directed force to the front-most cassette in the first collection means 16 to keep the cassettes upright. A ledge and/or a line of bristles 44 acting from above provide a counter to the force applied by the retaining member 42 to prevent the cassettes in the first collection means 16 from sliding back onto the infeed conveyor 20. The retaining member 42 is attached to a block 46 which slides in opposed guide rails 48. An extension 50 is affixed to the block 46 to interrupt a sensor 52 when the retaining member 42 has reached its maximum distance from the infeed conveyor. This signifies that a full row of cassettes is located in the first collection means 16.

When the cassettes are transferred from the first collection means 16 to the second collection means 18, a spring 54, which imparts the rearward bias to the retaining member 42, brings the retaining member 42 back to its starting position, adjacent the infeed conveyor 20.

The transfer mechanism 55 includes a pneumatically actuated cylinder 56 which acts on a block 58, to move a pusher wall 60. The movement of the wall is stabilized in the middle by a notched rail member 62, and at the front by a guide bar 64. The notched rail member 62 is itself guided by two pairs of opposed members 66 which are mounted on a small platform 68. The pusher wall 60 spans the length of the first collection means 16. Thus, when the actuator 56 is extended, the pusher wall 60 pushes the entire row of cassettes in the first collection means 16 toward and into the second collection means 18. When the row of cassettes has cleared the first collection means 16, the actuator 56 is reversed and the pusher wall 60 is brought back to its original, rest position.

The second collection means 18 is capable of holding a plurality of rows of cassettes, preferably at least three rows. The second collection means 18 comprises a bottom tray 68 which has a hole 72 cut in it to accommodate a sensor 74. When the final row of cassettes is pushed into the second collection means 18, the first row of cassettes covers the sensor 74 which sends a signal to the control box 6 to prevent the transfer mechanism 55 from being activated. The entire tray 70 can then be removed to allow for easy handling of the cassettes. When the tray 68 is removed, a second sensor 76 is exposed, which also sends a signal to the control box 6 to prevent the transfer mechanism 55 from being activated. The second sensor 76 is important since the removal of the tray 70 uncovers the first sensor 74.

Figure 3:
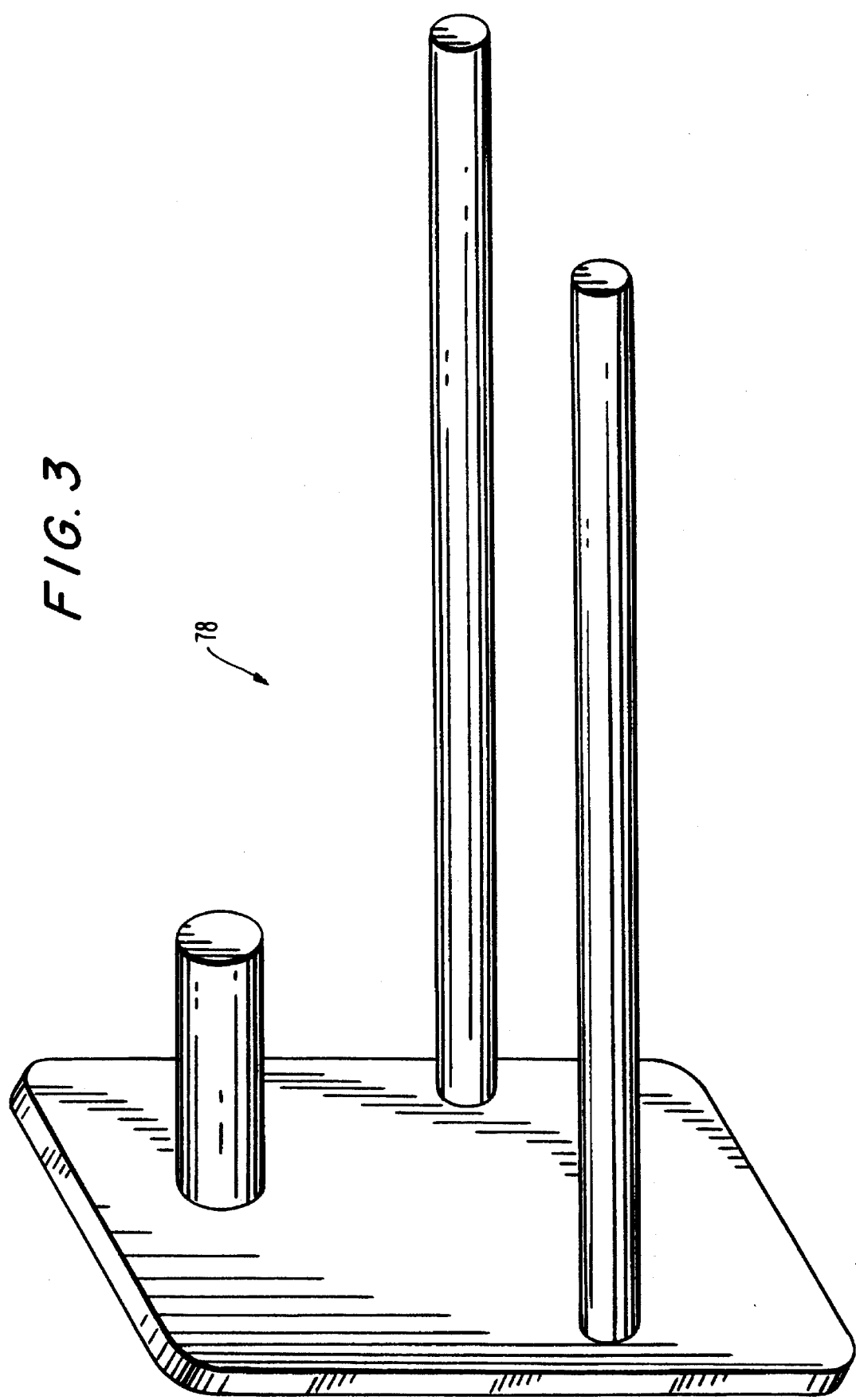
FIG. 3 is a perspective view of a cassette row pick-up device for removing cassettes from the present invention.

Optionally, a cassette removal device 78 as shown in FIG. 3 can be used to remove rows of cassettes from the second collection means 18. This can be done at the operator's convenience and, if done frequently enough, can eliminate the need to remove the tray 70.

In operation, the stacker/stamper 1 is turned on via on-off switch 8. The speed of the infeed conveyor 20 is set via switch 12 and the stamper 21 is activated via switch 14, if stamping is desired. As loaded cassettes reach the end of the discharge conveyor associated with one or more loading machines 22, they are passed onto the infeed conveyor 20 of the stacker/stamper 1. As cassettes move up the infeed conveyor 20 they are held in position, before the stamper 21, until the previous cassette completely passes by the sensor 32, located on the opposite side of the stamper 21. When the stopper 30 is retracted, the cassette moves along the conveyor 20 until it is positioned directly under the stamper 21. This positioning is controlled by the sensor 32 which sends a signal to stop the conveyor and activate the stamper when the cassette's leading edge completely blocks the sensor's "eye." When the stamper completes its cycle, the conveyor is restarted and the cassette passes beyond the sensor 32. At that point, as indicated previously, the sensor 32 sends another signal to retract the stopper 30 and permit the next cassette to be positioned underneath the stamper 21.

The stamped cassette continues up the conveyor 20 until it abuts stop wall 38 and is sensed by the sensor 34. The pusher 36, in response to a signal generated by the sensor 34, pushes the cassette forward into the first collection means 16.

As the pusher 36 continues to push cassettes into the first collection means 16, the row of cassettes supported by the tray 40 grows, and the retaining member 42 is pushed farther from the conveyor 20. When the first collection means 16 is full, the extension 50, blocks sensor 52 which generates a signal activating the transfer mechanism 55.

The actuator 56, in response to the signal from the sensor 52 moves the pusher wall 60 such that the row of cassettes in the first collection means 16 is pushed into the second collection means 18. The actuator 52 then retracts to bring the pusher wall 60 back to its rest position. When the pusher wall 60 clears the first collection means 16, spring 54 brings the retaining member 42 back to its first position.

When the final row of cassettes is pushed into the tray 70, the sensor 74 is covered. This causes a signal to be generated which prevents the transfer mechanism 55 from being activated and attempting to transfer another row of cassettes into the second collection means 18. If the entire tray 70 is removed, the second sensor 76 is uncovered and a similar signal, deactivating the transfer mechanism 55 is again sent.

It will be recognized that in the described embodiment the inclined conveyor and the three row capacity of the second collection means are but one possible configuration. In fact the conveyor can be flat and the capacity of the second collection means can be expanded to virtually any desired size.

Although the present invention has been described with reference to a specific embodiment, neither the exact described operation, nor the specific structure mentioned should be construed as limiting since the disclosed embodiment is merely illustrative of the invention. One of skill in the art may alter the described embodiment without departing from the spirit or scope of the invention.

What is claimed is:

1. An apparatus for stacking and stamping cassettes comprising:

infeed means for feeding cassettes received from an external source;

stamper means adjacent said infeed means for stamping a code on said received cassettes;

pusher means for removing cassettes from said infeed means to a first collection means for accumulating cassettes in a row; and transfer means for transferring cassettes from said first collection means to a second collection means, wherein said second collection means is capable of holding a plurality of rows of cassettes.

2. An apparatus according to claim 1, further comprising first sensor means for detecting the presence of a cassette in a selected position along said infeed means and for generating a signal in response to said detection to activate said stamper means.

3. An apparatus according to claim 2, wherein said infeed means comprises a conveyor.

4. An apparatus according to claim 3, wherein said signal generated by said sensor means causes said conveyor to stop.

5. An apparatus according to claim 1, further comprising sensor means for sensing the presence of a cassette at a position adjacent said first collection means and for generating a signal in response to said detection to activate said pusher means to remove the detected cassette from said infeed means to said first collection means.

6. An apparatus according to claim 1, wherein said first collection means comprises:

tray means for supporting a plurality of cassettes in a row;

a spring biased retaining member for applying a force to said row of cassettes to maintain said cassettes in a vertical orientation; and sensor means for detecting the presence of said retaining member at a selected position and for generating a signal to activate said transfer means in response to said detection.

7. An apparatus according to claim 1, wherein said infeed means is inclined.

8. An apparatus according to claim 1, wherein said second collection means comprises:

removable tray means for supporting said plurality of rows of cassettes; and first sensor means for detecting the presence of cassettes in a selected position in said tray means and for generating a signal in response to said detection to deactivate said transfer means.

9. An apparatus according to claim 8, further comprising second sensor means for detecting when said tray means is removed and for generating a signal in response to said detection of said removed tray to deactivate said transfer means.

10. An apparatus according to claim 1, further comprising sensor means for detecting the presence of a cassette in a selected position along said infeed means and for generating a first signal in response to said detection to activate stopper means for holding back other cassettes carried on said infeed means.

11. An apparatus according to claim 10, wherein said sensor means also detects when a cassette has moved along said infeed means a predetermined distance beyond said selected position and generates a second signal in response to said detection to deactivate said stopper means to allow other cassettes to move along said infeed means.

* * * * *